United States Patent Office 2,700,657
Patented Jan. 25, 1955

2,700,657

MELT-SPINNABLE, FIBER FORMING BLEND OF POLYSTYRENE AND SPECIFIC STYRENE-ACRYLONITRILE INTERPOLYMERS

Alfred T. Look and Joseph N. McDonald, Jr., Midland, Mich., assignors to The Dow Chemical Company, Midland, Mich., a corporation of Delaware No Drawing. Application November 13, 1951, Serial No. 256,155

6 Claims. (Cl. 260—45.5)

This invention relates to a composition of matter and to a method for making multifilaments from such composition.

The usual method for making multifilamentary articles from organic plastics involves the extrusion or spinning of the plastic from a plurality of orifices, followed by combination of the several fibers to form the desired strand. There are many well-known difficulties to be avoided or overcome in such standard practice. It would be preferable to be able to extrude a relatively large monofilament and to convert that product into multifilamentary form. In doing so, it is desirable that the final product have considerable strength. Compositions are known which can be extruded in the form of monofilaments and which can be flexed or twisted to yield multifilamentary products, but such compositions have commonly contained mixed cellulose esters and the multifilamentary product has been weaker than a monofilament made from a single cellulose ester. It has been suggested that nearly any two fiber-forming thermoplastics which are incompatible when molten can be mixed and extruded as monofilaments and twisted or flexed, without orientation, to give multifilamentary products, and that the amount of either constituent of such mixture can vary from 5 to 95 per cent of the composition. It has been found, however, that many mixtures of plastics which have little if any compatibility in the molten condition do not yield useful fibering filaments when extruded and twisted.

Because of the desirable properties of polystyrene, it would be desirable to produce tough flexible multifilamentary articles therefrom, and to do so by the simple method discussed above. The plastic materials which are normally considered to be most incompatible with polystyrene and which would be assumed to give the desired fibering mixtures with polystyrene do not behave as expected.

It has been found, however, that mixtures of from 80 to 98 per cent polystyrene and complementarily from 20 to 2 per cent of a particular class of copolymer can be extruded, stretched and flexed or twisted to give tough multifilamentary articles. The useful class of copolymer, just referred to, consists of binary copolymers of styrene with at least 20 per cent of acrylonitrile and ternary copolymers of styrene with at least 20 per cent acrylonitrile and at least 20 per cent alpha-methyl styrene. Thus, styrene-acrylonitrile copolymers and styrene-acrylonitrile-alpha-methyl styrene copolymers may be used, if the copolymer contains at least 20 per cent of acrylonitrile and of any alpha-methyl styrene which is present. A significant fibering tendency is observed when as little as 2 per cent of the mixture is one of the defined copolymers, and the multifilamentary product is strong and tough when the mixture contains up to about 20 per cent of such copolymer. When much larger amounts of the copolymer are used, the fibrous product obtainable is undesirably weak. Optimum amounts of copolymer in the mix are near 8 per cent.

Attempts have been made to use with polystyrene similar amounts of such diverse thermoplastic materials as ethyl cellulose, polymeric methyl methacrylate, vinyl as ethyl cellulose, polymeric methyl methacrylate, vinylidene chloride-vinyl chloride copolymers, polyvinyl chloride, polyethylene, and styrene-butadiene copolymers. No signfiicant fibering is obtained with any of these mixtures except ethyl cellulose and polyethylene and the fibers obtainable from polystyrene-ethyl cellulose mixtures and polystyrene-polyethylene mixtures are very weak.

Several mixtures were prepared consisting of granules of polystyrene and granules of a ternary copolymer of 35 per cent styrene, 30 per cent acrylonitrile and 35 per cent alpha-methyl styrene. Each mixture was extruded at about 460° F. through an orifice 0.1 inch in diameter. The hot filamentary product was taken away from the orifice by a pair of rubber draw rolls operated at a speed to reduce the diameter of the filament to 0.075 inch and positioned a distance from the orifice sufficient to permit partial cooling of the extrusion to about 230° F. before stretching occurred. The partially stretched filament, after passing around snubbing rolls, was stretched further by a second set of draw rolls to reduce its diameter to about 0.020 to 0.030 inch. The resulting oriented product, when twisted about its longitudinal axis, or when flexed several times, split into a multifilamentary strand. When this yarn was heated for about an hour at 80° C., the twist was permanently set in the yarn. The following table compares the properties of such yarns made from different percentages of polystyrene and copolymer, and using various stretch ratios, the latter term indicating the ratio of the final length of stretched product to the length of the same weight of material after any hot stretching near the extruder.

Table

| Percent Copolymer | None | 2 | 8 | None | 8 | 20 | None | None |
|---|---|---|---|---|---|---|---|---|
| Stretch Ratio | 9.2 | 9.2 | 9.2 | 5.8 | 5.8 | 5.8 | 3.9 | 2.4 |
| Single Fiber properties: | | | | | | | | |
| Tensile strength, pounds per square inch | 12,850 | 12,150 | 13,830 | 13,220 | 12,820 | 12,260 | 10,840 | 8,950 |
| Elongation to break, percent | 8 | 10 | 20 | 6 | 10 | 7 | 6 | 5 |
| Number 360° bends to break | 16 | 22 | 23 | 5 | 20 | 19 | 5.5 | 2 |
| Knot strength, percent of tensile strength | 49 | 64 | 78 | 79 | 67 | 71 | 90 | 74 |
| Properties of ten parallel fibers: | | | | | | | | |
| Tensile strength | | 10,310 | 10,810 | | 9,870 | 10,220 | | |
| Breaking load, pounds | | 61 | 55 | | 50 | 50 | | |
| Properties of ten fibers, twisted and set: | | | | | | | | |
| Tensile strength | | 8,640 | 10,190 | | 8,860 | 9,760 | | |
| Breaking load, pounds | | 51 | 52 | | 45 | 48 | | |

It is observed, from the foregoing tabulated data, that the fibers obtained by extruding, stretching and twisting the described mixtures of polystyrene and the identified copolymer are substantially as strong, both individually and collectively, as polystyrene fibers stretched to an equal extent. The toughness of the new fibers is greater than that of the comparable polystyrene fibers, as measured by the product of tensile strength times elongation. The flexibility of the new fibers is greater than that of comparable polystyrene fibers, as shown by the greater number of double bends required to break a fiber. The knot strength is surprisingly good for a highly oriented product, especially when compared with oriented crystalline polymers.

Similar results are obtained when binary copolymers of styrene and at least 20 per cent acrylonitrile are substituted for the ternary copolymer of styrene, acrylonitrile and alpha-methyl styrene used in the example.

When ethyl cellulose was substituted for the ternary copolymer of the example, a multifilamentary product was obtained having tensile strengths less than half those of comparable polystyrene fibers, and having little ability to be stretched or bent before breaking.

The extrusion and test conditions used on the samples reported in the table were strictly comparable, but were not necessarily optimum for the materials under observation. Thus, it has been found that when the preferred mixture is extruded into a liquid non-solvent bath and then stretched before it is too cold, even better multi-filamentary products are obtained after flexing or twisting.

A mixture of 92 per cent polystyrene and 8 per cent of the ternary copolymer of the prior example was extruded through an oval orifice and stretched after partial cooling to about 6 times its original length per unit weight. The so-stretched rod was about 0.077 inch by 0.110 inch, in cross-section. When flexed and twisted, it formed numerous coarse fibers and resembled binder twine in appearance. The breaking strength of the twine was about 65 pounds, which is above the observed minimum strength of 60 pounds for a standard commercial binder twine of sisal fibers.

We claim:

1. A composition of matter consisting essentially of an intimate mixture of from 80 to 98 per cent polystyrene and complementarily from 20 to 2 per cent of a copolymer selected from the class consisting of binary copolymers of styrene and at least 20 per cent acrylonitrile and ternary copolymers of styrene and at least 20 per cent of acrylonitrile and alpha-methyl styrene.

2. A composition of matter consisting essentially of from 80 to 98 per cent polystyrene and complementarily from 20 to 2 per cent of a ternary copolymer of about 35 per cent styrene, about 30 per cent acrylonitrile, and about 35 per cent alpha-methyl styrene.

3. A composition of matter consisting essentially of about 92 per cent polystyrene and about 8 per cent of the ternary copolymer of about 35 per cent styrene, about 30 per cent acrylonitrile, and about 35 per cent alpha-methyl styrene.

4. An article of manufacture made by the melt extrusion of the composition claimed in claim 1.

5. An article of manufacture made by the melt extrusion of the composition claimed in claim 2.

6. An article of manufacture made by the melt extrusion of the composition claimed in claim 3.

References Cited in the file of this patent

UNITED STATES PATENTS

| Number | Name | Date |
|---|---|---|
| 2,123,599 | Fikentscher et al. | July 12, 1938 |
| 2,545,869 | Bailey | Mar. 20, 1951 |